United States Patent [19]

Rathbun et al.

[11] Patent Number: 4,631,723
[45] Date of Patent: Dec. 23, 1986

[54] MASS STORAGE DISK DRIVE DEFECTIVE MEDIA HANDLING

[75] Inventors: Donald J. Rathbun, Andover; Bruce H. Tarbox, Billerica, both of Mass.; Taian Su, Palo Alto, Calif.

[73] Assignee: Honeywell Information Systems Inc., Waltham, Mass.

[21] Appl. No.: 618,640

[22] Filed: Jun. 8, 1984

[51] Int. Cl.[4] ............................................ G06F 11/20
[52] U.S. Cl. ...................................... 371/10; 364/200; 360/47
[58] Field of Search ............... 371/10, 11, 21; 360/47, 360/53; 364/200, 900

[56] References Cited

U.S. PATENT DOCUMENTS

| | | | |
|---|---|---|---|
| 3,771,143 | 11/1973 | Taylor | 364/200 |
| 4,150,428 | 4/1979 | Inrig et al. | 364/200 |
| 4,405,952 | 9/1983 | Slakmon | 360/49 |
| 4,434,487 | 2/1984 | Rubinson et al. | 371/10 |

*Primary Examiner*—Charles E. Atkinson
*Attorney, Agent, or Firm*—George Grayson; John S. Solakian

[57] ABSTRACT

A disk drive of a mass storage subsystem includes areas on a disk surface wherein a vendor-generated defective sector log, a software-generated defective sector log and an alternate sector log are stored. A random access memory (RAM) stores a copy of the defective sector logs. During a seek operation, firmware tests the defective sector logs in RAM to generate the alternate sector log for that cylinder number. During the read or write operation, the alternate sector log is checked before processing the sector to determine if it is a defective sector. If the sector is defective, the head is positioned to another cylinder at a head and sector address read from the alternate sector log.

4 Claims, 4 Drawing Figures

MASS STORAGE DISK DRIVE DEFECTIVE MEDIA HANDLING

BACKGROUND OF THE INVENTION

1. Field of the Invention

This invention relates generally to the mass storage disk drive media, and more particularly to the processing of head and sector numbers which address defective sectors.

2. Description of the Prior Art

Mass storage disk devices include a number of disks rotating about a common vertical axis. Both the top and bottom surfaces of each disk are typically coated with a magnetic material which retains magnetic bits. One read/write head is mounted on a carriage which moves in a radial and perpendicular manner to the common axis. Magnetic bits are written on the media surface when the carriage has positioned itself. Each head, therefore, would write in turn on the respective surfaces. The magnetic bit patterns for a surface are in concentric circles called tracks. The same track number on each surface represents a cylinder. The magnetic bit patterns are written in zones called sectors. Typically each track could be divided into 42 sectors. Therefore, to select a sector of data (magnetic bits), the disk device requires a cylinder number, a head number and a sector number. Data bytes are transferred between the disk device and a main memory, a sector at a time.

Typical disk drives store data in the order of megabytes: 24MB, 48MB, 100MB 500MB, etc. It is unreasonable to expect and uneconomical to build disk drives having surfaces which can record in every bit position and on every track. Accordingly, rules are negotiated between manufacturers and users that a number of defective sectors will be acceptable and the defective areas will be written in a predetermined track and sector.

This presents the problem of how does a user handle the defective sector in the normal computer operation without sacrificing throughput. Another requirement is for the user to designate defective sectors found during normal computer processing. A disk, therefore, could store both software-noted as well as vendor-noted defective sectors.

One obvious method is to compare the desired sector with the defective sector written in the defective sector track. This technique requires two seeks per data transfer thereby reducing system throughput.

U.S. Pat. No. 4,434,487 entitled "Disk Format for Secondary Storage" describes a system whereby an evenly distributed portion of each disk is reserved as spare sectors for replacing defective sectors. Also, there are stored on the disk multiple copies of a table containing a list of each replacement block and the address of any bad block mapped to it.

This table is searched to find the appropriate replacement address. These techniques reduce the number of sectors available for the storage of data bytes and require considerable software or firmware overhead to process the defective sector seeks.

U.S. Pat. No. 4,214,280 entitled "Method and Apparatus for Recording Data Without Recording on Defective Areas of a Data Recording Medium" describes a method which includes detecting a defective area on a data recording area, writing an address of the defective area on a data recording area, recording data on the data recording area by detecting the defective area with the address and writing part of the data on the data recording area up to the defective area and writing the remaining data on the data recording area succeeding the defective area.

U.S. Pat. No. 4,405,952 entitled "Apparatus for Detecting Faulty Sectors in a Magnetic Disk Memory" describes a system whereby one or more sectors on each track is a salvage sector. Here again the storage capacity of the disk is reduced.

OBJECTS OF THE INVENTION

It is a primary object of the invention to provide an improved disk device subsystem.

It is an object of the invention to provide a disk subsystem having improved system throughput.

It is another object of the invention to provide a disk subsystem having improved means for handling defective media areas.

It is yet another object of the invention to provide a disk subsystem for positioning a head on a single seek operation to address an alternate sector to an addressed defective sector.

It is still another object of the invention to use areas of a random access memory to locate the alternate sector address when a defective sector is being addressed.

SUMMARY OF THE INVENTION

A disk drive is delivered from the manufacturer with a number of defective areas of the media written on sector 0 of a track of a selected disk surface. Each area is expressed as a byte displacement. The displacements are converted to sector numbers and the track reformatted. The defective area address includes a flag byte, a cylinder number, a head number and a sector number.

In addition, defective sectors found during normal processing are identified in sector 1 of the above track.

A portion of a random access memory (RAM) is divided into 3 fixed areas. A first fixed area stores sequentially the cylinder, head and sector numbers for each vendor-noted defective sector. A second fixed area stores sequentially the cylinder, head and sector numbers for each defective sector found during normal processing. Hexadecimal FF is written into each of the remaining locations of the first and second areas of RAM and all the locations of the third fixed area.

Simultaneously, with the disk device receiving a seek order, the first and second areas are searched sequentially for a cylinder number comparison. For each cylinder number comparison found, the contents of an alternate sector register are placed in an address location of a third area at an address determined by the head and sector number stored in RAM associated with that cylinder number. The predetermined (stored) value in the address location of the third area is representative of the head and sector number of the alternate sector on the disk surface.

The alternate sector register is initially preset to hexadecimal 40 and preincremented after every cylinder number comparison search. After the search of the first and second areas is completed, the third area will have stored in each location addressed by a head and sector number associated with the cylinder number for which a comparison was found, a different predetermined value indicative of the position of that cylinder in the first and second areas.

As an example, if there were six defective sectors in a cylinder, the third area of RAM would store the contents of the alternate sector register, the preincremented predetermined value, in six address locations of the RAM. The addresses would be determined by the head and sector numbers of the cylinder number for which the comparison was found. Each preincremented predetermined value is the head and sector number of the alternate sector.

A seek order may call for the processing of several sectors on a track, a number of which may be in a defective area. The first and second areas of RAM are searched for the defective sectors and the third area of RAM now has stored the alternate sectors. Before each sector of the track is processed, a search is made of the third area of RAM. If hexadecimal FF is stored in a location addressed by the head and sector number, then that sector is processed. Any other number found in that location is the head and sector number of the alternate sector. The head assembly will be positioned to the predetermined alternate sector cylinder and process the specified sector by the specified head.

BRIEF DESCRIPTION OF THE DRAWINGS

The novel features which are characteristic of the invention are set forth with particularity in the appended claims. The invention itself, however, both as to organization and operation may best be understood by reference to the following description in conjunction with the drawings in which:

DESCRIPTION OF THE PREFERRED EMBODIMENT

Figure 1:
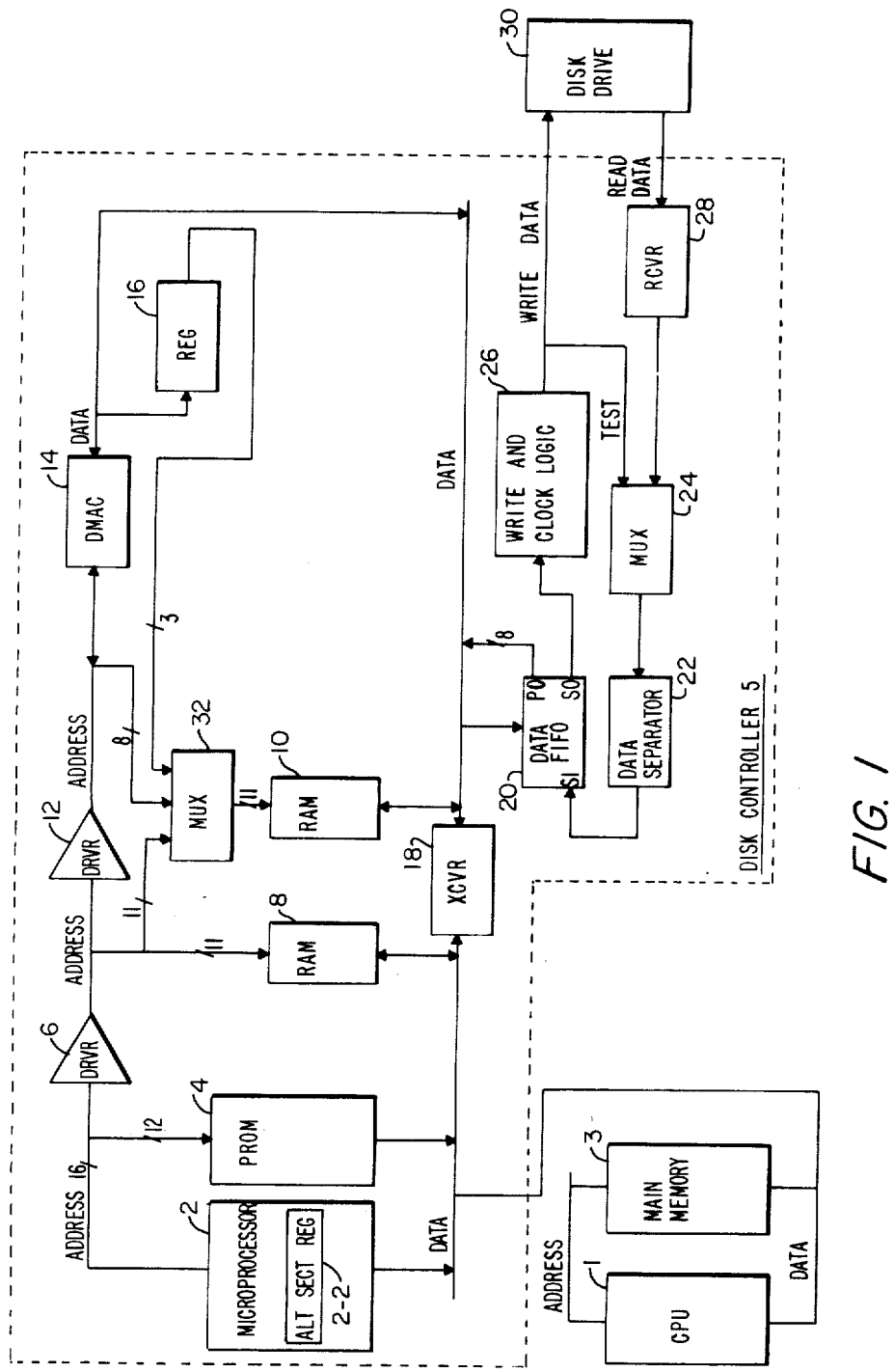
FIG. 1 shows a block diagram of the disk drive subsystem.

FIG. 1 is a block diagram of a disk controller 5 which transfers blocks of data bytes, typically 256 bytes, between a disk drive 30 and a main memory 3. A multimode DMA controller (DMAC) 14 receives a starting address of a random access memory (RAM) 10 and a range indicating the number of bytes in the data block transfer, in this case 256 bytes, via drivers (DRVR) 6 and 12.

During a disk read operation, data bytes are read from a specified sector on the surface of the disk and stored in RAM 10 at an address specified by the DMAC 14 via a receiver (RCVR) 28, a multiplexer (MUX) 24, a data separator 22, and a data first in-first out memory (FIFO) 20.

The data separator 22 selects the data bits making up the 256 byte data field from the stream of bits. The data FIFO 20 receives the serial bit stream at the SI terminal and transfers 8 bit bytes to RAM 10.

The 256 address locations in RAM 10 are specified by the 8 address signals received by RAM 10 from the DMAC 14 via a MUX 32. The starting address stored in the DMAC 14 is incremented and the range stored in the DMAC 14 is decremented for each data byte stored in RAM 10. The data transfer is concluded when the range has counted down to ZERO.

The 256 data bytes are then transferred to main memory 3 from RAM 10. Microprocessor 2 generates sequential addresses which are applied to RAM 10 via DRVR 6 and MUX 32. CPU 1 stores the starting main memory 3 address and range. The data bytes read from RAM 10 are applied to main memory 3 via a transceiver (XCVR) 18.

During the disk drive 30 write operation, the 256 data byte block is transferred from main memory 3 at addresses specified by CPU 1 to RAM 10 at addresses specified by microprocessor 2. Microprocessor 2 addresses are applied to RAM 10 via DRVR 6 and MUX 32. The data bytes are applied to RAM 10 via XCVR 18.

When the block of data bytes is stored in RAM 10, microprocessor 2 loads the DMAC 14 with the starting address and range. Under DMAC 14 control, data bytes are read from RAM 10 to data FIFO 20 where the data byte is serialized and applied to a write and check logic 26 and then to the disk drive 30 via the WRITE DATA signal line.

RAM's 8 and 10 store 2,048 bytes and therefore must be addressed by 11 address signals. The DMAC 14 provides 8 address signals and 3 data signals via a register 16 to RAM 10 via MUX 32.

Figure 2:
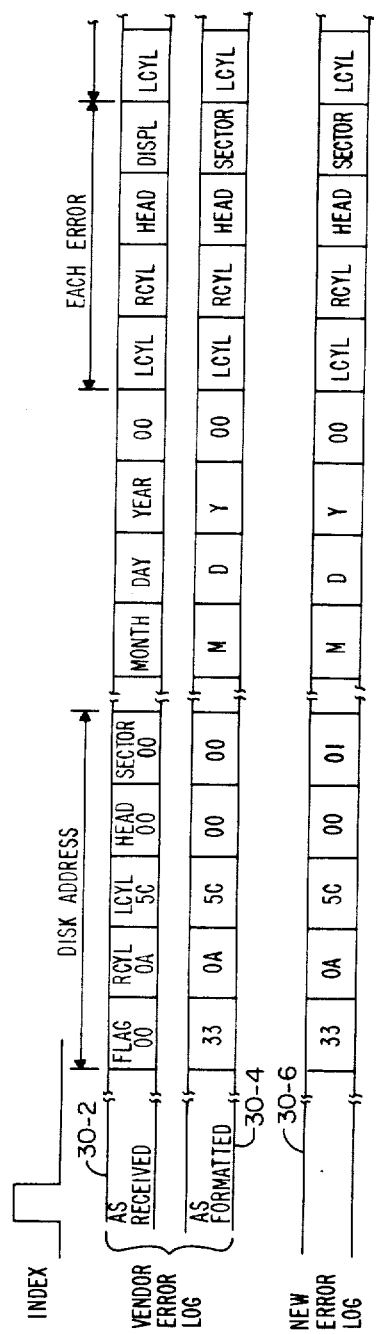
FIG. 2 shows the layout on the disk surface track of the defective sector log.

FIG. 2 shows the layout on track 604 (hexadecimal 0A5C), sector 00, head 00 of the various defective sector notations. The disk drive 30 is received from the vendor with the vendor error log 30-2 written on track 604 identified with a flag byte of hexadecimal 00. Included is the data, and for each defective track area there is a left cylinder byte, a right cylinder byte, a head number and a displacement. The vendor includes the displacement since the number of sectors per track is determined by the user.

Typically there are 13,440 bytes per track divided into 42 sectors. The displacement D equals the byte count divided by 64. The defective sector number, therefore, is $(42 \times D \times 64/13440) = (D/5)$ or the displacement divided by five.

The firmware causes the vendor error log 30-4 to be formatted with the calculated sector number and identified by a flag byte of hexadecimal 33.

A new error log 30-6 is created in sector 01 to list defective media sectors found by the software.

Figure 3:
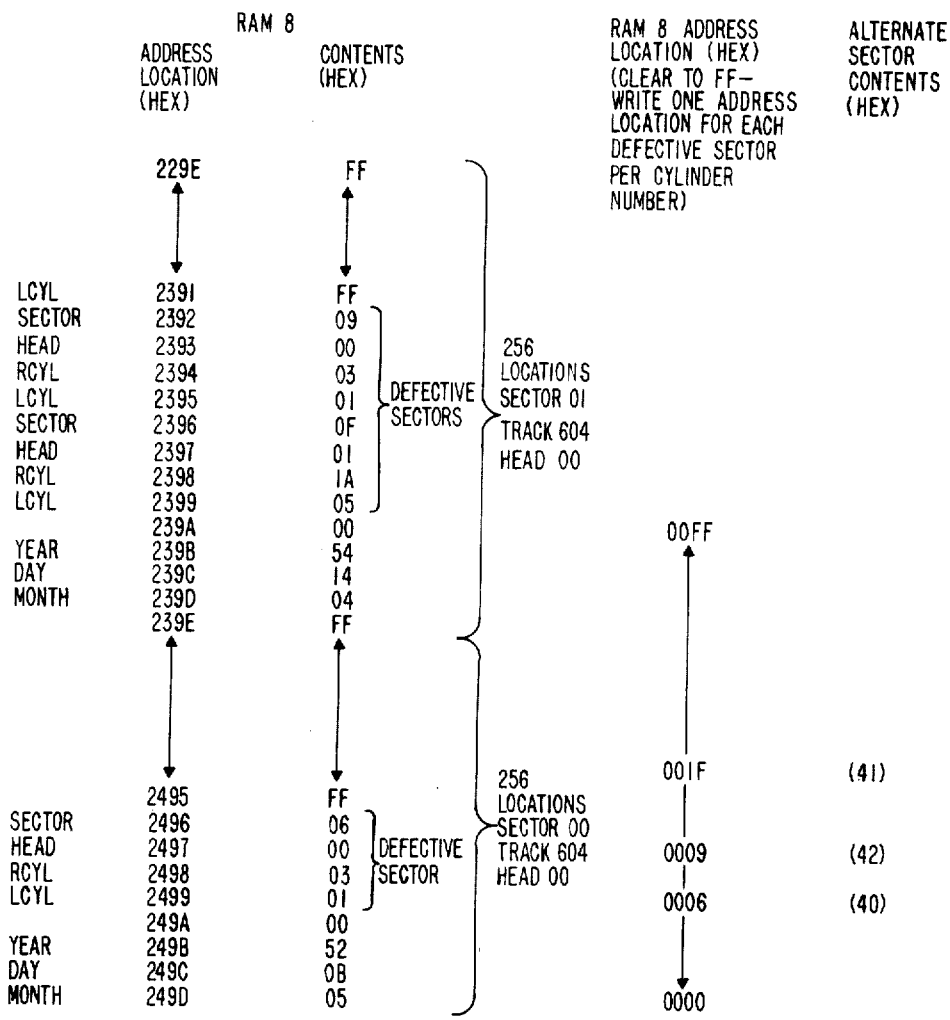
FIG. 3 shows a layout of the random access memory defective sector and alternate sector areas.

FIG. 3 shows a layout of the contents of the locations in RAM 8 storing the disk drive 30 defective media sectors. As an example, the 256 address locations, hexadecimal 239E through 249D, store the defective sector as indicated by the formatted vendor error log of FIG. 2 read from cylinder hexadecimal 0A5C, head 00, sector 00. The 256 address locations, hexadecimal 229E through 239D, store the new error log of FIG. 2 read from cylinder hexadecimal 0A5C, head 00, sector 01. Address locations hexadecimal 0000 through 00FF store the alternate head and sector number at an address generated by the defective head and sector number.

Initially, each address location, hexadecimal 0000 through 00FF and 229E through 249D, is loaded with hexadecimal FF. The defective sectors from sector 00, head 00, cylinder 0A5C are then written in sequential address locations of RAM 8. As an example, cylinder 0103, head 00, sector 06 is a defective sector and is stored in address locations hexadecimal 2496 through 2499. The defective sector location was read from track 604 (cylinder) hexadecimal 0A5C), sector 00, head 00 of disk drive 30. Note that the remainder of the address locations associated with sector 00 contain hexadecimal FF.

Also, address locations hexadecimal 2396 through 2399 store defective sector hexadecimal cylinder 051A, head 01 and sector 0F. Address location hexadecimal 2392 through 2395 store cylinder 0103, head 00 and sector 09. The remainder of the address locations associated with sector 01 contain hexadecimal FF.

Address locations hexadecimal 0000 through 00FF are set to hexadecimal FF before each disk drive 30 seek. As the disk drive 30 seek is starting, the cylinder number of the desired track sector is compared with the cylinder numbers stored in the sector 00 address locations of RAM 8 starting with address location hexadecimal 2499 and decrementing until the contents of a left cylinder location is hexadecimal FF. This indicates that all of the defective sectors of the formatted vendor error log have been compared with the cylinder number of the desired sector.

The firmware jumps to address location hexadecimal 2399 and again searches for cylinder numbers of decrementing the addresses of RAM 8 until hexadecimal FF is found, in this case in address location hexadecimal 2391.

The alternate sector address is generated in the following manner. As described above, the vendor error log is written on track 604, sector 00 by head 00 and the new error log is written in sector 01 of track 604 by head 00. The alternate sectors of track 604 read by head 02 replace the defective sectors.

The alternate sector numbers are stored in address locations of RAM 8 defined by the head and sector of the defective sector for which there is a cylinder number match.

As the disk drive 30 received the order to position its head to cylinder hexadecimal 0103, a search was started at address location hexadecimal 2499 for 0103. Once 0103 was found, in the case after reading address location hexadecimal 2498, the head and sector information in address locations 2497 and 2496 are read out and used to form an address for RAM 8 and a hexadecimal 40 is stored in address location 0006 of RAM 8. Hexadecimal 40 is binary 0100 0000 (HHSS SSSS) which indicates that the alternate sector for cylinder 0103, head 00, sector 06 is found in cylinder hexadecimal 0A5C (604), sector 00 under head 01.

The counter in microprocessor 2 storing hexadecimal 40 is preincremented to hexadecimal 41 and address location hexadecimal 2495 was read. The hexadecimal FF indicates that sector 0 does not contain any more defective sector addresses.

The firmware then reads address location hexadecimal 2399 which contains a hexadecimal 05 and not FF. This indicates a defective sector and, even though there is not a cylinder match, the counter is preincremented to hexadecimal 42.

The search of RAM 8 continues and address location hexadecimal 2395 is read. When a match is found after reading address location 2394, then hexadecimal 42 is written into address location 0009 and the counter preincremented to hexadecimal 43.

In this case, two address locations, hexadecimal 0006 and 0009, of the alternate sector area of RAM 8 will store hexadecimal 40 and 42, respectively; all other address locations between hexadecimal 0000 through 00FF will store hexadecimal FF.

If cylinder 051A was requested, then hexadecimal 41 would be written into address location hexadecimal 001F (binary SSHH SSSS). Note the rearrangement of the head and sector bits to compact the addresses of locations to hexadecimal 0000 through 00FF.

Address locations hexadecimal 0000 through 00FF are initialized to hexadecimal FF at the beginning of every seek operation. One of the address locations is written for each cylinder comparison found. If no cylinder match is found, then all address locations hexadecimal 0000 through 00FF remain at hexadecimal FF.

Figure 4:
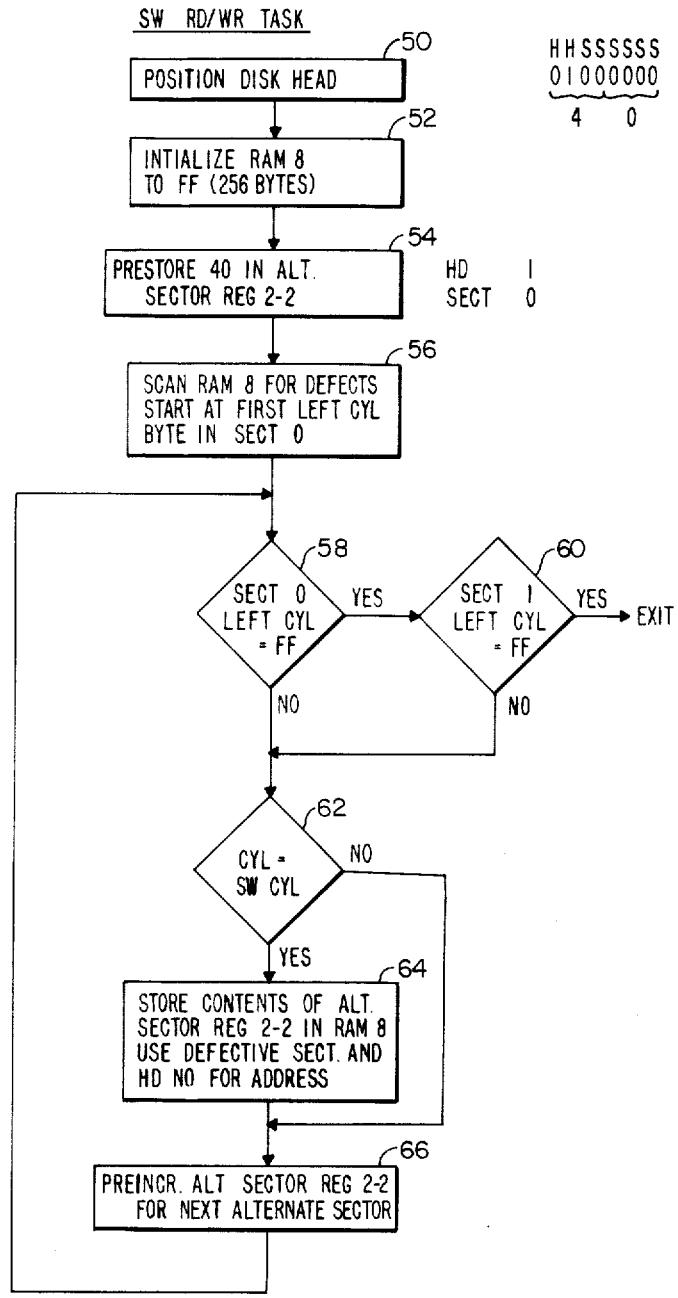
FIG. 4 is a flow diagram of the defective sector search during a disk drive seek operation.

FIG. 4 is a flow diagram of the generation of the alternate sector addresses if a defective sector is addressed.

When a software instruction to transfer data between disk 5 and main memory 3 is processed by CPU 1, an order is sent to microprocessor 2 to execute a microprogram to position the head assembly to a cylinder position. Block 50 sends the cylinder number to disk 5.

Block 52 initializes 256 address locations, hexadecimal 0000 through 00FF, to hexadecimal FF of RAM 12. These locations store the alternate head and sector address of a defective addressed sector.

Block 54 stores hexadecimal 40 in the alternate sector register 2-2 of FIG. 1. The binary configuration of hexadecimal 40 is 0100 0000 or HHSS SSSS which calls for head hexadecimal 01 and sector hexadecimal 00. If a defective sector is addressed, this microinstruction conditions the selection of head 01 to read the alternate sector in cylinder 604 (hexadecimal 0A5C).

Block 56 scans the RAM 8 address location starting with the first left cylinder byte at address location hexadecimal 2499 and decrementing to hexadecimal 229E.

Decision block 58 tests the contents of address location hexadecimal 2499 for hexadecimal FF indicating that there are no vendor error log defective sectors written in sector 00, head 00, cylinder hexadecimal 0A5C.

If decision block 58 indicates hexadecimal FF, then decision block 56 tests address location hexadecimal 2399 for hexadecimal FF indicating that there are defective sectors written in the new error log. If hexadecimal FF is read, then the microprogram exits. This indicates that the desired cylinder has no defective sectors.

If decision block 58 found a defective sector, that is, the contents of address location hexadecimal 2499 was not hexadecimal FF, then decision block 62 tests if the cylinder number in address locations hexadecimal 2499 and 2498 are equal to the software requested cylinder number. If it is not equal, then block 66 preincrements the alternate sector register 2-2 to hexadecimal 41 and branches to decision block 58.

This five decision block 58 tests address location hexadecimal 2399 and test hexadecimal FF as above. If the contents of address location hexadecimal 2399 is not hexadecimal FF, then decision block 62 tests the cylinder number. If in this case decision block 62 finds that the software requested cylinder number is equal to the cylinder number stored in address locations hexadecimal 2399 and 2398, then block 64 is called.

Block 64 writes the contents of the alternate sector register 2-2 into an address location in RAM 8 specified by the head and sector numbers read from address locations hexadecimal 2397 and 2396.

If there was not a cylinder match found in the 256 address locations storing the sector 00 sector addresses, address locations hexadecimal 2499 through 239E and a hexadecimal FF was found at a left cylinder position, then decision block 58 would retain the hexadecimal FF and the above operation is repeated with the decision blocks 60 and 62 as described above.

Assume that the vendor-noted defective areas appear sequentially on track 604, sector number 0 and are read by head number 0, and the software-noted defective areas appear sequentially on track 604, sector number 1 and are also read by head number 0. The vendor-noted defective addresses appear in the same sequence as on the track in the first area of RAM and the software-noted defective areas appear in the same sequence as on the track in the second area of RAM.

The alternate sectors for both the vendor-noted and software-noted sectors are assigned in sequence to track 604 which is read by head 01 starting with sector 0.

When the software requests a seek operation by sending the cylinder number, head number and sector number to the disk drive, the firmware under microprocessor 2 control compares the cylinder numbers of each defective sector stored in areas 1 and 2 of RAM in sequence with the desired cylinder number. If the cylinder numbers are equal, then a predetermined number is written into an address location in the alternate area of RAM specified by the head and sector number. The predetermined number starting with hexadecimal 40 is incremented by ONE for each defective sector found whether or not there is a cylinder comparison. As an example, if there is a comparison with the third defective sector, the alternate sector appears as sector 02, track 01. The alternate area in RAM will store a hexadecimal 42 (binary 0100 0010 HHSS SSSS). The two high order bits identify the head number and the six low order bits identify the sector number.

If a hexadecimal FF is read from area 1 of the RAM as the left cylinder number during the comparison search, then the next sector searched is the first sector in area 2. Finding a hexadecimal FF in a first cylinder location of area 2 of the RAM indicates there are no defective sectors on the disk that were found during system operation. For each read or write sector operation, the head and sector numbers sent by the software are used to address the alternate sector area of RAM 8. If hexadecimal FF is read from RAM 8, then the read or write operation takes place. If hexadecimal FF is not read from RAM 8, then a seek to track 604 is performed and the head and sector number read from RAM 8 is used. Following the read or write operation, the heads are returned to the original cylinder for processing the next sector on the track.

This technique results in there being no delay in seek time when the software is addressing a sector whether or not it is defective.

Having shown and described a preferred embodiment of the invention, those skilled in the art will realize that many variations and modifications may be made to affect the described invention and still be within the scope of the claimed invention. Thus, many of the elements indicated above may be altered or replaced by different elements which will provide the same result and fall within the spirit of the claimed invention. It is the intention, therefore, to limit the invention only as indicated by the scope of the claims.

What is claimed is:

1. A method in a mass storage disk device of addressing a sector on the surface of a disk and selecting an alternate sector if said sector was previously recorded as being a defective sector, the method comprising the steps of:
   (a) prestoring a predetermined number in a register;
   (b) storing an address of each defective sector in a first area of a random access memory (RAM);
   (c) comparing in turn each cylinder number portion of said address stored in said RAM with a cylinder number of said sector on said disk being addressed;
   (d) incrementing said register after each comparison test; and
   (e) writing the contents of said register in a second area of said RAM during each equal comparison at a location specified by each head and sector number portion of said address, said contents of said register being indicative of an alternate sector number and an alternate head number of a predetermined cylinder on which is stored said alternate sector.

2. A method in a mass storage disk device for addressing a plurality of sectors on the surface of a disk of said disk device and selecting an alternate sector for each of said plurality of sectors which was previously recorded as being a defective sector, the method comprising the steps of:
   (a) storing a predetermined number in a register;
   (b) storing an address of each of said defective sectors in a first area of a random access memory (RAM);
   (c) receiving a first plurality of addresses for reading or writing a first plurality of said plurality of sectors, each of said first plurality of addresses including a same cylinder number;
   (d) comparing each cylinder number stored in said first area of said address of said each of said defective sectors with said same cylinder number;
   (e) incrementing said register after each equal and unequal comparison; and
   (f) storing the contents of said register in a second area of said RAM at a location specified by a sector number and a head number portion of said address stored in said first area which is associated with each of said same cylinder numbers when an equal comparison is found between said each cylinder number and said same cylinder number, sand contents of said register indicating an alternate head number and an alternate sector number of a predetermined cylinder.

3. A method of locating an alternate sector on a track of a mass storage disk device when a defective sector is addressed, the defective sector being either vendor-defined or system-defined, the method comprising the steps of:
   (a) writing a first predetermined number in each location of a first, second and third area of a random access memory (RAM);
   (b) storing a first cylinder number, a first sector number and a first head number for each of a plurality of vendor-defined defective sectors in said first area of RAM locations;
   (c) storing a second cylinder number, a second sector number and a second head number for each system-defined defective sector in said second area of RAM locations;
   (d) receiving a seek order including a third cylinder number, a plurality of third sector numbers and a third head number for positioning a plurality of heads to a track defined by the third cylinder number and the third head number for processing information;
   (e) comparing said third cylinder number with each of said first cylinder numbers;
   (f) prestoring a second predetermined number in a register and incrementing the contents of said register after each comparison operation;
   (g) writing the contents of said register in said third area of RAM locations at a location indicated by said first head number and said first sector number associated with said first cylinder number during each comparison operation in which said first cylinder number compares equally with said third cylinder number;

(h) branching to said second area of RAM locations if the first predetermined number is read from a location in said first area of RAM indicating that all of said first cylinder numbers have been compared with said third cylinder number;

(i) comparing said third cylinder number with each of the second cylinder members;

(j) incrementing said contents of the register after each comparison operation;

(k) writing said contents of said register in said third area of RAM locations at a location indicated by said second head number and said second sector number associated with said second cylinder number during each comparison operation in which said second cylinder number compares equally with said third cylinder number;

(l) reading a third area of RAM at a location addressed by said third head number and one of said plurality of third sector numbers; and (m) positioning said plurality of heads to read one of the sectors defined by said third cylinder number, said third head number and said one of said plurality of third sector numbers when said first predetermined number is read from said third area of RAM at said location defined by said third sector number and said one of said plurality of third sector numbers indicative of a nondefective sector, and positioning said plurality of heads to read said alternate sector at a predetermined cylinder number and at a head and sector position indicated by said contents of said register from said third area of RAM at said location defined by said third sector number and said one of said plurality of third sector numbers indicative of said alternate sector.

4. A method in a mass storage disk device of processing an alternate sector if an addressed sector is defective, a predetermined track and a first predetermined sector of a disk surface of said disk device having a vendor error log in a vendor format, the method comprising the steps of:

(a) reformatting said first predetermined sector wherein an address of each vendor defective sector is written in said first predetermined sector in a system format replacing said vendor format;

(b) testing said disk surface for defective sectors other than noted in said vendor error log and writing an address of each system defective sector in said system format in a second predetermined sector;

(c) clearing a first, a second and a third area of random access memory (RAM) to a first predetermined number;

(d) writing said address of each vendor defective sector in said first area of RAM;

(e) writing said address of each system defective sector in said second area of RAM;

(f) storing a second predetermined number in an alternate sector register;

(g) comparing a requested cylinder number of a requested sector with a cylinder number portion of each of said addresses stored in said first area of RAM;

(h) comparing said requested cylinder number with a cylinder number portion of each of said addresses stored in said second area of RAM;

(i) incrementing said alternate sector register after each comparison;

(j) writing the contents of said alternate sector register for each equal comparison at a location of said third area of RAM at an address defined by a head number and a sector number associated with said cylinder number portion; and (k) reading a location of said third area of RAM addressed by a requested head number and a requested sector number and said requested cylinder number, and processing said requested sector at said requested cylinder number, said requested track number and said requested head number if said location contains said first predetermined number, and processing said alternate sector at a predetermined cylinder number, an alternate head number and an alternate sector number if said location contains said alternate head number and said alternate sector number.

* * * * *